United States Patent [19]

Brooks

[11] 4,326,390
[45] Apr. 27, 1982

[54] APPARATUS AND METHOD FOR THAWING FROZEN FOOD

[75] Inventor: Robert B. Brooks, Louisville, Ky.

[73] Assignee: General Electric Company, Louisville, Ky.

[21] Appl. No.: 188,420

[22] Filed: Sep. 18, 1980

[51] Int. Cl.³ .............................................. F25D 25/02
[52] U.S. Cl. ........................................ 62/382; 62/441
[58] Field of Search ................. 62/155, 234, 382, 441; 165/30

[56] References Cited

U.S. PATENT DOCUMENTS

| | | | |
|---|---|---|---|
| 2,465,107 | 3/1949 | Mascoli et al. | 62/89 |
| 2,467,464 | 4/1949 | Carriere | 62/89 |
| 2,758,452 | 8/1956 | Walz | 62/116 |
| 2,810,267 | 10/1957 | Reuter et al. | 62/155 |
| 3,034,313 | 5/1962 | Janos et al. | 62/155 |
| 3,134,242 | 5/1964 | Hanson | 62/197 |
| 3,241,334 | 3/1966 | Amore | 62/382 |
| 4,213,309 | 7/1980 | Pifer | 62/457 |

*Primary Examiner*—Ronald C. Capossela
*Attorney, Agent, or Firm*—Frederick P. Weidner; Radford M. Reams

[57] ABSTRACT

Apparatus and method for thawing frozen food for use in a refrigerator appliance with a storage compartment maintained at a temperature between 33°-55° F. There is provided a container for receiving a frozen food load to be thawed within the compartment. An electric fan is in air flow communication with the interior of the container and timer means are provided for energizing and then deenergizing the fan after a predetermined period of operating time whereby the frozen food load may be thawed and allowed to remain in the container subsequent to thawing, the temperature within said container being substantially at the temperature of the storage compartment thus preventing spoilage of the thawed food.

8 Claims, 5 Drawing Figures

APPARATUS AND METHOD FOR THAWING FROZEN FOOD

BACKGROUND OF THE INVENTION

This invention relates to food thawing apparatus and method and, more particularly, to apparatus and method adapted for incorporation in a household refrigerator which operates to thaw frozen food and maintain the thawed food at refrigerated temperatures.

The advantages of freezing food for preservation purposes are offset to some extent by the need to thaw the frozen food before it can be made ready for food preparation. In general, the need to thaw certain foods before cooking or making use of it in food preparation procedures is well known. Typically, thawing of frozen food can be accomplished by allowing the food to stand at room temperature until it is fully thawed. Such thawing, however, results in a substantial amount of liquid being drained from the food. In addition, when the food is allowed to stand at room temperature, the timing must be such that the food is used promptly upon thawing or else placed back into the refrigerator to avoid the possibility of food spoilage. In some cases, it is recommended that the frozen food be placed in the fresh food compartment of a refrigerator until thawed. This procedure, however, takes a very long time to achieve thawing.

Microwave ovens are currently available that have provision for a low-power setting intended to permit thawing of frozen food by means of electromagnetic radiation of energy into the food load. Although somewhat beneficial for this purpose, the microwave oven has certain drawbacks when used for defrosting frozen food. One of the drawbacks is that the frozen food is heated initially near the surface of the food load with internal heating (thawing) being a function of the degree of heat conduction through the food from the surface. Moreover, energy load-in at localized portions of the food, e.g., in the vicinity of a bone, can actually cause the food to become fully cooked at these locations while other portions of the food load are still frozen. In addition, once the food load is thawed, it either must be used immediately or placed back in the refrigerator to again avoid the possibility of food spoilage.

In the past, refrigerators have been provided with a frozen food thawing compartment that is located adjacent to the machine compartment so that air heated by the machine compartment, such as the condensing unit, flows into the receptacle to warm the frozen food articles and thaw them. See, for example, U.S. Pat. Nos. 2,465,107; 2,467,464; and 2,758,452. This type of refrigerator thawing does not avoid the possibility of food spoilage once the food is thawed and, in fact, may promote spoilage because of the elevated temperature unless it is used immediately or placed in the refrigerator compartment for preservation.

Refrigerators have also been provided with compartments for thawing frozen food which compartments are insulated and heated by a hot gas circuit in the refrigerating system. See, for example U.S. Pat. No. 3,134,242. This type of food thawing system in refrigerators requires that a substantial amount of heat be applied in one form or another to the food items being thawed. In a refrigerating atmosphere, this is not desirable from an energy saving standpoint as the refrigerator must work harder in order to maintain the proper refrigerated temperature within the refrigerator and the thawing chamber must be heavily insulated. Moreover, when the food is thawed, it is maintained at an elevated temperature that again could cause spoilage unless removed from the thawing chamber and placed in the refrigerated compartment.

There is, therefore, a need for a reliable, low cost, food thawing apparatus and method suitable for household use. There is a need for such an apparatus and method that does not require constant attendance to avoid food spoilage and for an apparatus and method that uniformly thaws the food load without heating of the food load before complete thawing is achieved. By my invention, there is provided an apparatus and method for thawing frozen food which will accomplish the above-desired results and which is easy to utilize for its intended purpose.

SUMMARY OF THE INVENTION

According to one aspect of my invention, there is provided apparatus and method for thawing frozen food for use in a refrigerator appliance with a storage compartment maintained at a temperature of between 33° and 55° F. There is a container for receiving a frozen food load to be thawed within the compartment. An electric fan produces a flow of air in communication with the interior of the container and timer means are used for initially energizing and then deenergizing the fan after a predetermined period of operating time. By this arrangement and method, the frozen food load may be allowed to remain in the container subsequent to thawing, the temperature within the container being substantially at the temperature of the storage compartment, thus preventing spoilage of the thawed food.

DESCRIPTION OF THE PREFERRED EMBODIMENT

Figure 1:
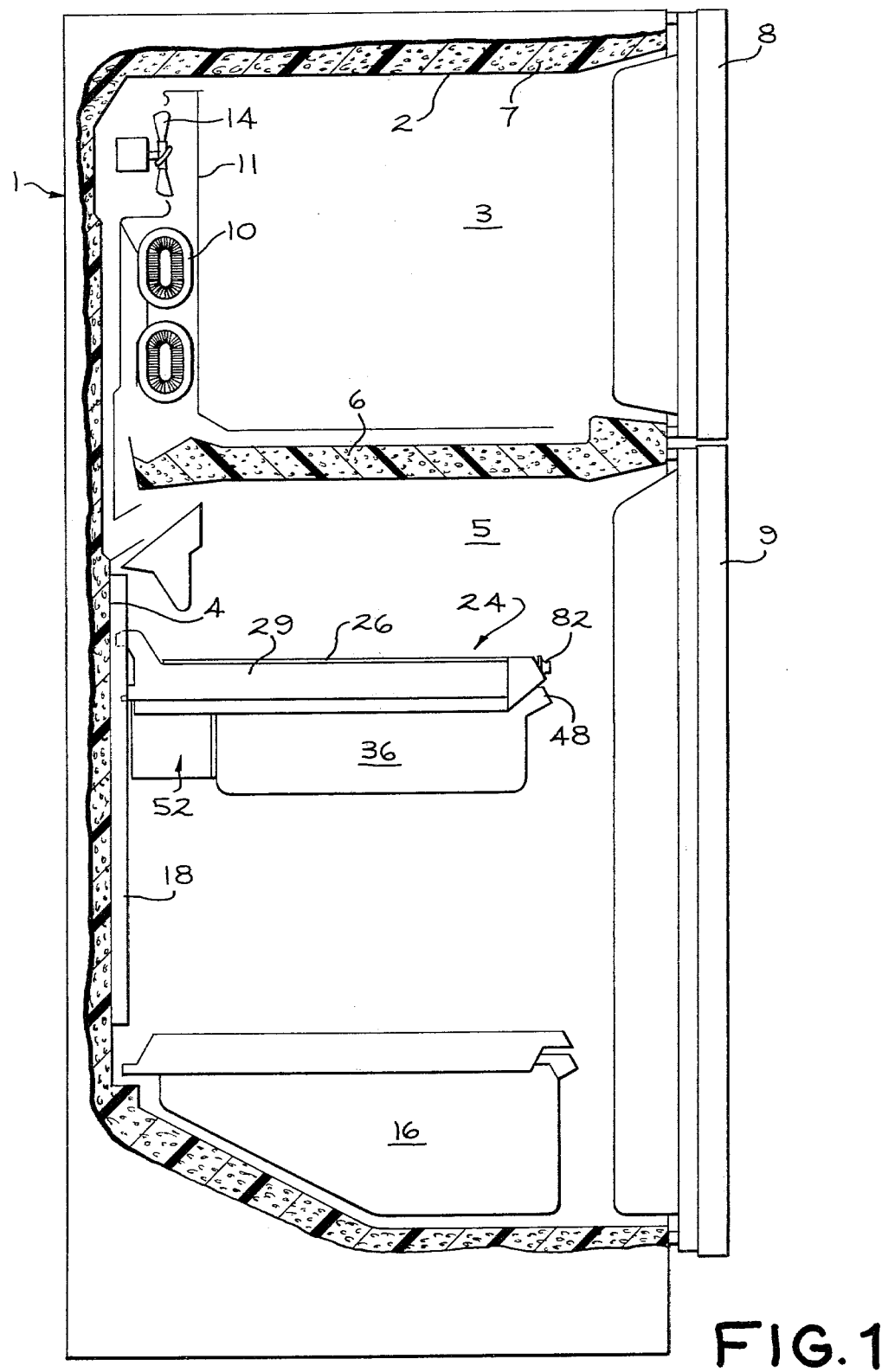
FIG. 1 is a side elevational view of a refrigerator partially broken away to show an exemplary embodiment of the present invention.

With reference to FIG. 1 of the drawings, there is illustrated a refrigerator cabinet, including an outer case 1, an upper inner liner 2 defining a freezer storage compartment 3 and a lower inner liner 4 defining a fresh food storage compartment 5. The compartments are separated by a partition 6 and the spaces between the liners and the outside case 1 are filled with suitable insulating material 7. The access opening to the freezer and fresh food compartments are respectively closed by doors 8 and 9.

Refrigeration for the two compartments is provided by an evaporator 10 positioned behind a wall 11 to separate it from food items stored in the freezer compartment. A fan 14 provides means for circulating air from the two compartments over the evaporator 10 and back into the compartments. It will be understood that the refrigeration system would also include a compressor, a condenser and controls (not shown) to maintain the fresh food storage compartment 5 at a temperature between 33°-55° F., as is well known in the refrigeration trade. Below 33° F., items in the food storage compartment could freeze and thawing of the frozen food load would be detrimentally affected. When the frozen food load is thawed, it is desirable to retain it at 55° F. and below to prevent spoilage.

Typically, the fresh food compartment 5 contains shelves and vegetable and meat pans for storing food items. One such storage pan 16 is shown at the bottom of the fresh food compartment 5. In many refrigerators, including the preferred embodiment shown in the drawings, the shelves are vertically movable on tracks 18 which are secured to the rear wall 20 of the lower inner liner 4. The shelves are movable vertically so that the user of the refrigerator may arrange them according to the specific needs of the items to be stored in the fresh food compartment.

Located within the fresh food compartment 5 is a container assembly 24 which is used for thawing frozen food items, and particularly, frozen meat, fowl or fish. The container assembly 24 includes a planar shelf 26 which is supported at each side thereof by brackets 28 and 29. The brackets 28 and 29 are cantilevered and include a shelf supporting hook-shaped end 22 which is removably inserted into slots 23 of each of the tracks 18 such that the brackets are movable vertically along the tracks 18.

Figure 5:
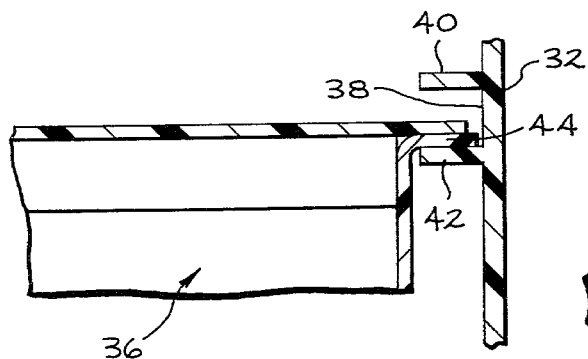
FIG. 5 is a fragmentary cross-sectional view of a portion of the present invention.

The brackets 28 and 29 are attached to both sides of the shelf 26 which has a horizontal panel 30 and downwardly depending side walls 32 and 34 to which the brackets 28 and 29 are attached. The shelf 26 has an inwardly open channel on both side walls 32 and 34 dimensioned to slidably receive a container 36. Both channels are of the same configuration. For instance as shown in FIG. 5, the channel on side wall 32 uses the inner surface 38 of the side wall as the bottom wall 38 and two legs 40 and 42 are formed on the inner surface of side wall 32 which are parallel to and spaced from each other to receive an outwardly turned lip 44 on each side of the container 36. With this arrangement then, the container 36 may be gripped, as by handle 48 at the front thereof, and moved along the channels so that the container 36 may be partially or completely removed from beneath the shelf 26.

Figure 2:
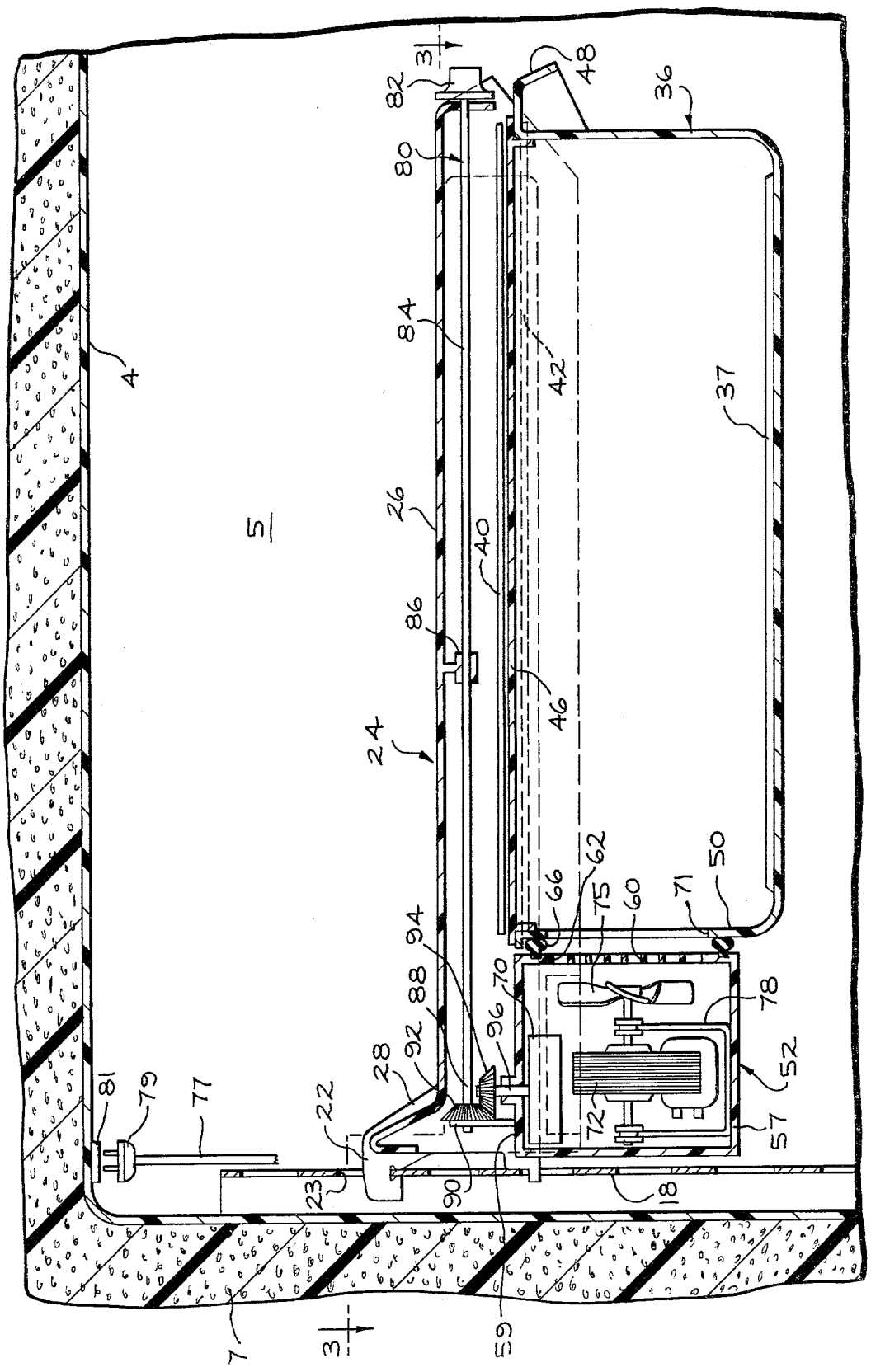
FIG. 2 is a fragmentary cross-sectional view of the refrigerator of FIG. 1 showing an embodiment of the present invention.
Figure 3:
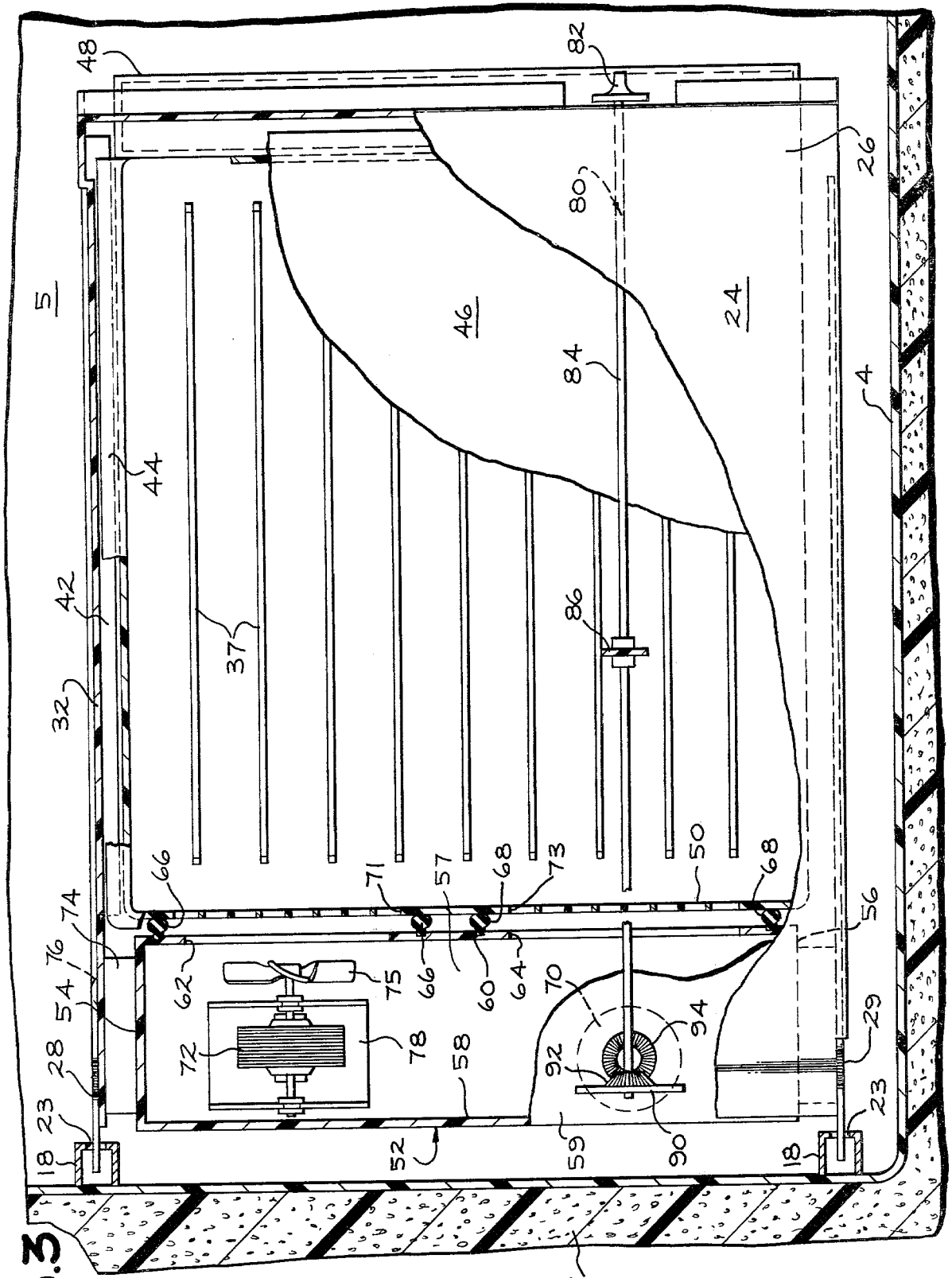
FIG. 3 is a view taken along lines 3—3 of FIG. 2.

The rear wall 50 of the container 36 has spaced openings in areas 71 and 73. Behind the rear wall 50 of the container 36 is a housing 52 having side walls 54 and 56, a bottom wall 57, a rear wall 58, a top wall 59 and a front wall 60. Front wall 60 has spaced openings in areas 62 and 64, which areas are surrounded by gaskets 66 and 68, respectively. Areas 71 and 73 with their spaced openings in rear wall 50 of the container 35 and areas 62 and 64 and their spaced openings in front wall 60 of the housing 52 are in communicating alignment, respectively, to allow air flow therethrough. Gaskets 66 and 68 form a seal between the front wall 60 of housing 52 and the rear wall 50 of container 36. On one side within the housing 52, there is located an electric timer 70 and on the other side within the housing 52 is a small electric fan 72. With reference to FIG. 3, the housing 52 is secured to the shelf 26 with a bracket 74 by any suitable fastening means, such as screws 76. The fan 72 is mounted to bottom wall 57 of housing 52 by a U-shaped support member 78. It will be noted that the fan 72 is mounted or located with respect to area 62 in the front wall 60 so that air being moved by the fan blade 75 during operation of the fan will flow through the openings in area 62 and the aligned openings in area 71 of the rear wall 50 of the container 36. With reference to FIG. 2, there is an electrical conduit 77 with a terminal plug 79 that may be connected and disconnected with a receptacle 81 that supplies electrical power to the timer 70 and fan 72. With this arrangement, if the user wishes to remove the entire container assembly 24 from the compartment 5, the plug 79 is disconnected from receptacle 81 and the brackets 28 released from the slots 23 in tracks 18 by raising the shelf 26 and the container assembly 24 lifted out of the compartment 5.

Timer 70 may be controlled by the user of the refrigerator by a control assembly 80 which includes at the front of the shelf 26 a manually rotatable knob 82. Secured to the knob 82 is a rod member 84 which extends from the front of the shelf 26 through guide member 86 to the rear of shelf 26 and is rotatably secured to an upstanding support 90 secured to top wall 59 of housing 52. Located forward of upstanding support 90 is a bevel gear 92 which is secured to rod member 84 and rotatable therewith in response to rotation of knob 82. Bevel gear 92 meshes with a bevel gear 94 at a right angle thereto which rotates with shaft 96 of the timer 70. With this arrangement then, by rotating knob 82, bevel gear 92 rotates through rod member 84 and causes bevel gear 94 to also rotate which will operate to set the timer to run for some amount of time. Contrawise, when the timer 70 is running, bevel gear 94 through timer shaft 96 rotates and that rotational movement is transmitted to bevel gear 92 through rod member 84 to knob 82. Timer 70 is utilized for initially energizing and then deenergizing the fan 72 after a predetermined period of operating time set by the user.

The operation of the frozen food thawing apparatus is as follows: The container 36 is moved along the channels of the downwardly depending side walls 32 and 34 as previously explained to remove it from underneath the shelf 26. The preferred embodiment has a container cover 46 that is removed and the frozen food load to be thawed is placed inside. The cover 46 is replaced and the entire container 36 is moved rearwardly along the channels until the rear wall 50 abuts in sealing engagement with the gaskets 66 and 68. The user then rotates knob 82 to set the timer for a desired length of thawing time. Rotational movement of the knob 82 is transmitted through rod member 84 to bevel gear 92, to bevel gear 94 and through timer shaft 96 to the timer 70. When the timer shaft 96 is rotated, electrical connections are made so that fan 72 is energized. Air is caused to flow by fan blade 75 through area 62 in the front wall 60 of housing 52 and area 71 in the rear wall 50 of container 36 into the interior of container 36 and around the frozen food load to be thawed. The air will be returned to the housing 52 through area 73 of rear wall 50 and area 64 in the front wall 60 and recirculated by the fan 72 as previously described. The bottom wall 98 of the container 36 has corrugations or ribs 37 to enhance air flow around the frozen food load. As the timer 70 is running, the rotational movement of the timer mechanism through shaft 96 and bevel gear 94 causes bevel gear 92 to rotate which rotational movement is transmitted through rod member 84 to knob 82. As a result, the knob 82 will rotate back to a zero setting when the timer run time has expired. When the time has expired, the fan 72 is deenergized by the timer and the frozen food load which has now been thawed will be retained at nearly the same temperature as the interior of the fresh food compartment thus preventing spoilage of the thawed food.

Figure 4:
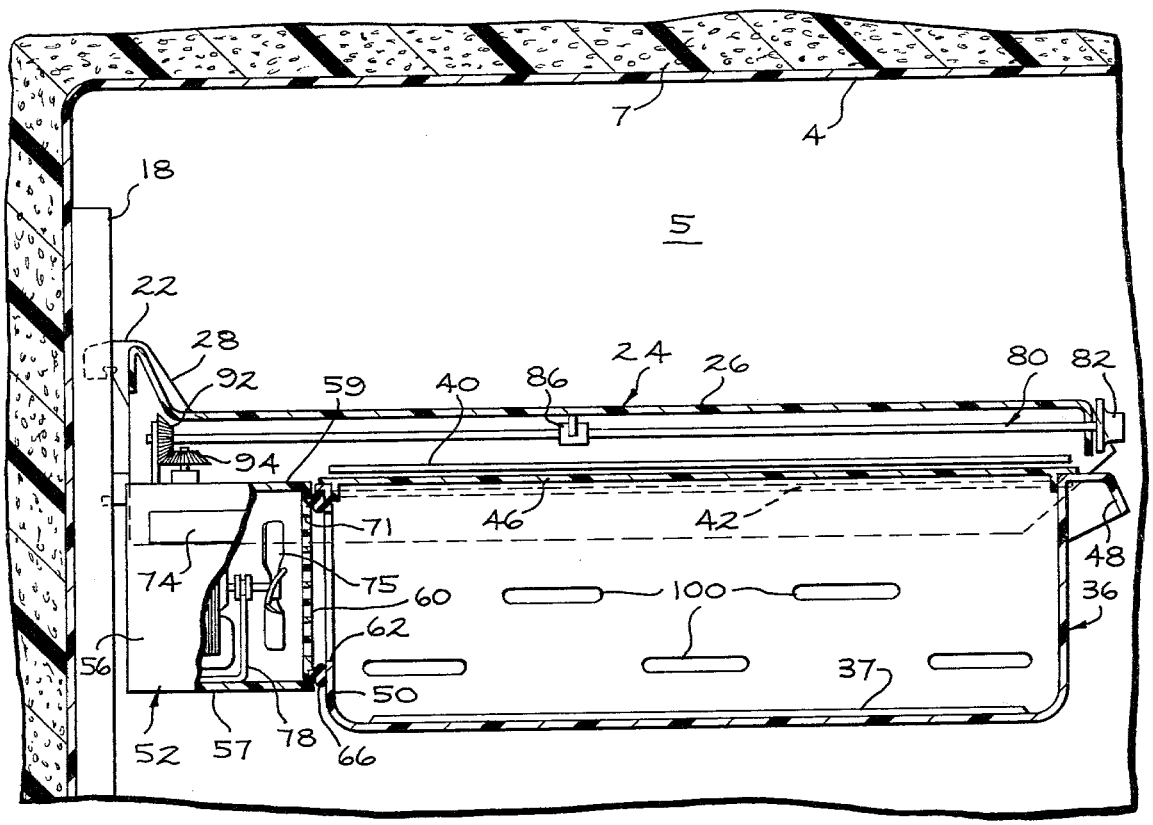
FIG. 4 is an alternate embodiment of the present invention shown in FIG. 2.

FIG. 4 shows an alternate embodiment to the frozen food thawing apparatus shown in the other figures, particularly FIG. 2, however, the only difference in the apparatus is that the container 36 has a plurality of openings 100 that allows ambient air from the compartment 5 into the interior of the container 36. In this manner, venting of the container takes place during delivery of the forced air flow to the interior of the container resulting in the temperature of the air in the container 36 and the air in the compartment 5 being more readily equalized.

By this food thawing apparatus and method, most frozen foods, particularly meat, fowl and fish, may be thawed much faster than simply placing the frozen food in the refrigerator and allow it to thaw. The frozen food is thawed with less liquid drainage than if the frozen food is allowed to thaw at room temperature and the user may thaw the frozen food and have it retained at proper storage temperatures to avoid spoilage.

The foregoing is a description of the preferred embodiment of the invention and it should be understood that variations may be made thereto without departing from the true spirit of the invention, as defined in the appended claims.

What is claimed is:

1. For use in a refrigerator appliance having a storage compartment maintained at a temperature between 33°-55° F., apparatus for thawing a frozen food load comprising:

a separate container located within the storage compartment for receiving a frozen food load to be thawed, said container and storage compartment having cooperating means to removably secure the container within the storage compartment;

an electric fan in air flow communication with the interior of the container; and manually settable timer means for initially energizing and then deenergizing the fan after a predetermined period of operating time;

whereby the frozen food load may be thawed and allowed to remain in said container subsequent to thawing, the temperature within said container being substantially at the temperature of the storage compartment thus preventing spoilage of the thawed food.

2. The frozen food thawing apparatus of claim 1 wherein the interior bottom of the container is corrugated.

3. The frozen food thawing apparatus of claim 1 wherein the container is vented to permit compartment ambient air to flow through the container when the fan is operating.

4. The frozen food thawing apparatus of claim 1 wherein electric fan and timer means are in a housing attached to a vertically movable shelf.

5. The frozen food thawing apparatus of claim 4 wherein the shelf may be removed from the compartment.

6. The frozen food thawing apparatus of claim 4 wherein the container is removable, supported on the vertically movable shelf.

7. The frozen food thawing apparatus of claim 4 wherein the housing and the container have communicating openings for air flow therethrough.

8. The frozen food thawing apparatus of claim 7 wherein a sealing gasket surrounds the communicating openings.

* * * * *